United States Patent [19]

Bautz et al.

[11] Patent Number: 5,536,035
[45] Date of Patent: Jul. 16, 1996

[54] DUAL SUSPENSION SHOCK TOWER

[75] Inventors: Jeffrey E. Bautz, Chesterfield; Kenneth G. Cross, St. Clair Shoees, both of Mich.

[73] Assignee: General Motors Corporation, Detroit, Mich.

[21] Appl. No.: 441,110

[22] Filed: May 15, 1995

[51] Int. Cl.[6] ............................................. B60G 11/15
[52] U.S. Cl. ...................... 280/660; 280/668; 280/688
[58] Field of Search ................................. 280/660, 661, 280/668, 691, 788, 688; 267/220

[56] References Cited

U.S. PATENT DOCUMENTS 4,750,755 6/1988 Hayashi et al. .................... 280/668
5,375,870 12/1994 Smith et al. ........................ 280/668

OTHER PUBLICATIONS

"Dual Suspension Shock Tower", Research Disclosure, Mar. 1994, p. 132, No. 35929.

Primary Examiner—Paul N. Dickson
Attorney, Agent, or Firm—Jeffrey A. Sedlar

[57] ABSTRACT

A dual suspension shock tower provides the ability to assemble either a turnable strut-type suspension or an SLA-type suspension in a vehicle as options within a single shock tower assembly.

3 Claims, 2 Drawing Sheets

DUAL SUSPENSION SHOCK TOWER

BACKGROUND OF THE INVENTION

The present invention relates to a vehicle suspension and more particularly, to a shock tower.

A typical vehicle suspension system includes a collection of springs, dampers, bushings, rods, links and arms which are used between each wheel and the car body or frame. The particular suspension system chosen for a vehicle plays an important role in providing specifically selected handling characteristics and in isolating the vehicle's body from road disturbances.

Two common types of independent suspensions include the turnable strut type and the short-long arm type (SLA), also known as a double-wishbone type. The type of suspension used in a particular vehicle depends on the suspension design criteria, which are determined based on various performance requirements such as packaging space availability, the selected level of handling and the amount of road isolation to be provided. Other significant issues in selecting the type of suspension used on a vehicle are the cost and the ease of assembling the suspension system. All of the above factors tend to drive the type of suspension which is chosen for use in a particular vehicle.

Typical vehicle bodies have a specific shock tower assembly for each type of suspension. A preference has been identified to provide the ability to assemble individual vehicles within a car line with either a turnable strut-type suspension or an SLA-type suspension. A conventional method of providing such flexibility is to use individualized shock tower assemblies for installation in the vehicle body to receive a specific type of suspension. These suspension options give rise to complicated packaging situations as well as increased investment and labor costs. Therefore, a means of addressing these drawbacks is desirable.

SUMMARY OF THE INVENTION

According to an aspect of the present invention a dual shock tower provides the option of packaging either a turnable strut type suspension or an SLA type suspension within a single vehicle shock tower. The dual shock tower according to the present invention includes an adaptor that is assembled between the suspension support structure and the top of the shock tower housing and which serves to secure either the strut mount of a turnable strut-type suspension or the shock absorber mount and upper control arm of an SLA-type suspension. The present invention provides the advantage of significantly reducing the initial investment and the amount of labor required to provide both a turnable strut-type suspension and an SLA-type suspension as alternate options for individual vehicles of a single car line.

DETAILED DESCRIPTION OF THE PRESENTLY PREFERRED EMBODIMENTS

Figure 1:
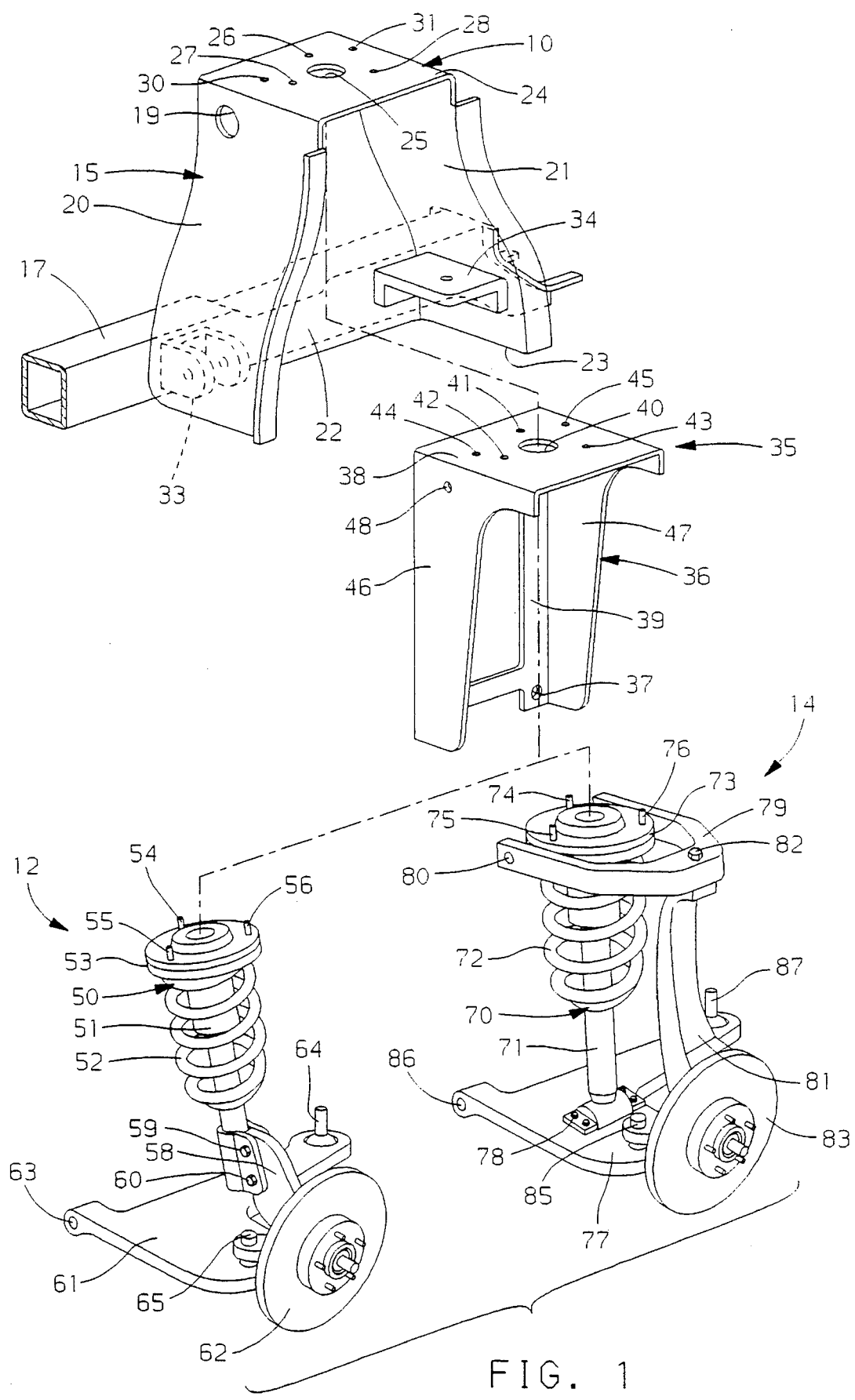
FIG. 1 is a partially exploded perspective view of a shock tower assembly according to the present invention showing alternative turnable strut type or SLA type suspension options.

Referring to the drawings, shown in FIG. 1 are structural details illustrating the concept of assembling either a turnable strut-type suspension 12 or an SLA-type suspension 14 into a single universal vehicle shock tower 10. Shock tower 10 includes a housing 15 secured to a suspension support 17 which is embodied as part of the vehicle structural supporting elements. The housing 15 includes walls 20 and 21 which generally flare outward towards a bottom opening 23 and between which is connected wall 22. Wall 20 includes access opening 19. Wall 21 may include a similar access opening (not illustrated), as required.

Formed integrally with the walls 20–22 is top 24 which includes a central opening 25, three suspension mounting openings 26–28 located around the central opening 25 and two adaptor mounting openings 30 and 31. The housing 15 is generally configured to provide an adequate opening to receive the suspension assembly without unduly intruding into the available space provided within the engine compartment of the vehicle.

Control arm mount 33 is securely attached to suspension support 17 and is carried within housing 15 near wall 20. Control arm mount 34 is securely attached to suspension support 17 and is carried within housing 15 near wall 21.

An adaptor 35 is configured to extend between suspension support 17 and the top 24 of housing 15. Adaptor 35 is designed to engage the selected vehicle suspension system and is therefore, capable of coupling with turnable strut type suspension 12 or SLA type suspension 14.

A characteristic of both suspensions 12 and 14 is that a rigid body structure is required to achieve desirable performance results. Car bodies and frames are generally considered rigid but in reality tend to be quite flexible. This amount of flexibility in practice alters the response of the suspension assembly as applied to a vehicle. Therefore, in addition to providing a convenient suspension assembly mounting means, the adaptor 35 affects the rigidity of the shock tower 10 and provides a relatively direct rigid connection to the suspension support 17 for transmitting forces.

Adaptor 35 is constructed of a rigid material such as steel and includes riser 36 which has a means for mounting to suspension support 17 such as fastener openings, representative of which, is opening 37. Riser 36 includes frame 39, brace 46 and brace 47 which are interconnected. Riser 36 is connected to platform 38 and provides support therefor. Platform 38 includes a central opening 40, suspension mounting openings 41–43 and adaptor mounting openings 44 and 45 which correspond to the related openings in the top 24 of housing 15. Braces 46 and 47 include means for attaching an upper control arm thereto such as opening 48.

The adaptor 35, when assembled within the housing 15, provides a simple and convenient means for securely assembling either the turnable strut type suspension 12 or the SLA type suspension 14 within the shock tower 10. The portion of adaptor 35 including platform 38 and the adjacent areas of braces 46, 47 and frame 39 are shaped to closely mate with the area of housing 15 adjacent the top 24.

The adapter 35 acts as a central structural member in the suspension's performance modes. It is designed to optimize mass efficiency of the suspension. Labor and component efficiency are provided since a single wheelhouse assembly is capable of receiving a plurality of suspension designs. Basic rigidity of the suspension is variable by selectively changing the gage thickness of the adapter 35.

The turnable strut suspension 12 exhibits a strut assembly 50 including damper 51, coil spring 52 and strut mount 53. The strut mount 53 includes fasteners 54–56 providing a means of extending through and attaching to the suspension mounting openings 41–43 of adaptor 35 and 26–28 of housing 15 to couple the strut assembly 50 to the shock tower 10.

The strut assembly 50 is connected to a steering knuckle and hub assembly 58 by bolts 59 and 60. The steering knuckle and hub assembly 58 is rotatably mounted to the control arm 61 and carries rotor 62. Control arm 61 includes mounting opening 63 for attachment to control arm mount 33 on suspension support 17 and mounting stud 64 for attachment to control arm mount 34 on suspension support 17. Steering knuckle and hub assembly 58 includes stud 65 for attachment to the vehicle steering linkage (not illustrated).

Figure 2:
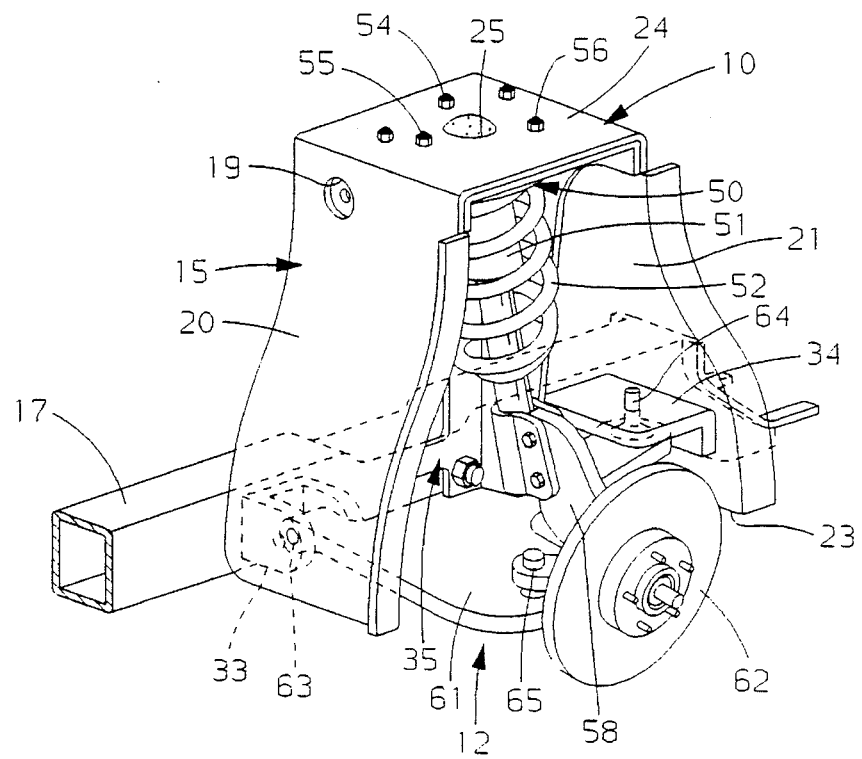
FIG. 2 is a perspective view of an assembled suspension system of the turnable strut type.

FIG. 2 illustrates the turnable strut suspension 12 assembled into the shock tower 10. Strut assembly 50 is coupled to the shock tower 10 by means of fasteners 54–56. Mounting opening 63 is positioned in control arm mount 33 for attachment thereto by a conventional means such as a pin, (not illustrated). Mounting stud 64 is engaged with control arm mount 34 for attachment thereto by a conventional means such as a nut, (not illustrated).

Referring again to FIG. 1, the SLA-type suspension 14 includes shock absorber assembly 70 which comprises damper 71, coil spring 72 and shock mount 73. Shock mount 73 includes fasteners 74–76 for extending through suspension mounting openings 41–43 of adaptor 35 and 26–28 of housing 15 for attaching the shock absorber 70 to the shock tower 10. The shock absorber 70 is connected directly to lower control arm 77 by a plurality of fasteners representative of which is fastener 78.

SLA suspension 14 includes upper control arm 79 which includes a means for attachment to shock tower 10 such as opening 80. Steering knuckle and hub assembly 81 is connected to upper control arm 79 by stud 82 and to lower control arm 77 for pivotal movement. Steering knuckle and hub assembly 81 carries rotor 83 and includes a stud 85 for attachment to the vehicle's steering linkage (not illustrated). Lower control arm 77 includes mounting opening 86 for attachment to control arm mount 33 on suspension support 17 and mounting stud 87 for attachment to control arm mount 34 on suspension support 17.

Figure 3:
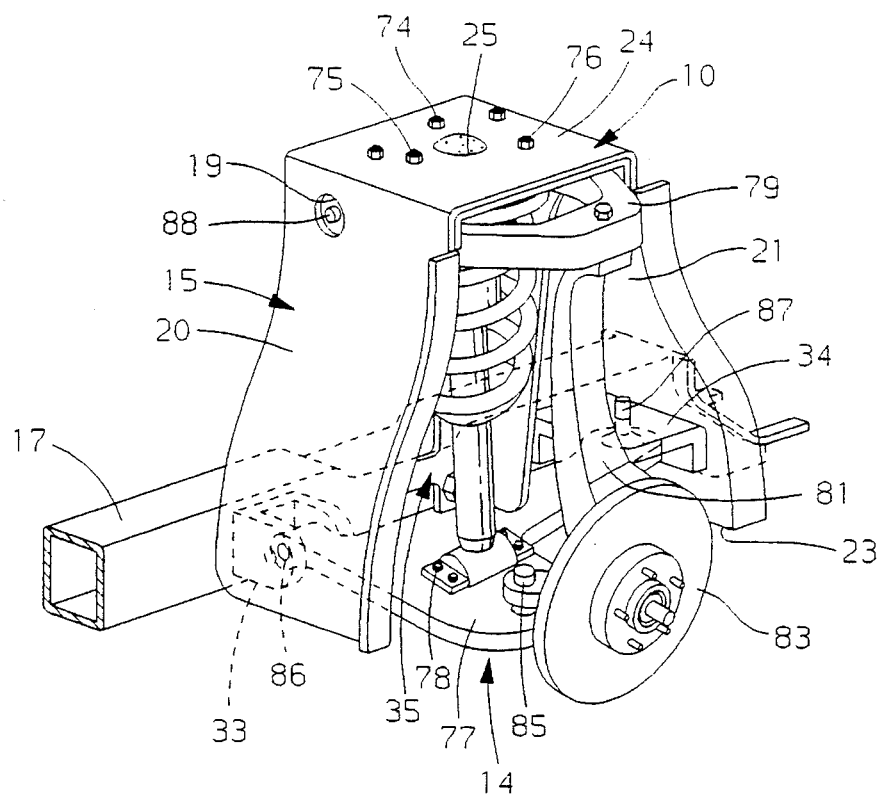
FIG. 3 is a perspective view of an assembled suspension system of the SLA type.

FIG. 3 illustrates SLA suspension assembly 14 assembled into shock tower 10. Shock absorber 70 is coupled to the shock tower 10 by means of fasteners 74–76. Mounting opening 86 is positioned in control arm mount 33 for attachment thereto by a conventional means such as a pin, (not illustrated). Mounting stud 87 is engaged with control arm mount 34 for attachment thereto by a conventional means such as a nut, (not illustrated). Upper control arm 79 is coupled to the adaptor 35 by means of a pin 88.

By means of the structure of the present invention the option of installing either an SLA or a turnable strut type suspension in individual vehicles of a single car line is provided. The complexity and costs associated with these options are reduced while concurrently maximizing space for other vehicle components within the engine compartment.

What is claimed is:

1. A dual suspension shock tower comprising:

a suspension support;

a housing having walls connected to the suspension support and having a top; and an adaptor carried within the housing and attached to the suspension support, the adaptor extending to the top of the housing and providing a rigid connection between the top and the suspension support wherein the adaptor comprises a riser including a frame and at least one brace, the riser being attached to the suspension support and extending to the top of the housing wherein the adaptor also includes a platform mating with the top and being supported by the riser, wherein the adaptor is capable of coupling with a short-long arm type suspension assembly and is capable of coupling with a turnable strut type suspension assembly.

2. A dual suspension shock tower comprising:

a suspension support providing structural support for the shock tower; and an adaptor providing rigidity to the shock tower and including a riser connected to the suspension support and extending upwardly, the riser including a frame and at least one brace, the adaptor also including a platform wherein the riser supports the platform;

wherein the adaptor is capable of coupling with a short-long arm type suspension assembly that includes a shock absorber with a shock mount, a lower control arm connected to the shock absorber, a steering knuckle and hub assembly connected to the lower control arm and an upper control arm connected to the steering knuckle and hub assembly by connecting the lower control arm to the suspension support, connecting the upper control arm to the brace and connecting the shock mount to the platform; and wherein the adaptor is capable of coupling with a turnable strut type suspension assembly that includes a strut assembly with a strut mount, a steering knuckle and hub assembly connected to the strut and a control arm connected to the steering knuckle and hub assembly by connecting the strut mount to the platform and connecting the control arm to the suspension support.

3. A dual suspension shock tower comprising:

a housing including a series of walls forming a bottom opening and a top connected to the series of walls;

a suspension support connected to the housing near the bottom opening and providing structural support for the shock tower; and an adaptor providing rigidity to the shock tower and including a riser and a platform, the riser connected to the suspension support and extending upwardly, the riser including a frame and at least one brace so that the riser supports the platform wherein the platform mates with the top;

wherein the adaptor is capable of coupling with a short-long arm type suspension assembly that includes a shock absorber with a shock mount, a lower control arm connected to the shock absorber, a steering knuckle and hub assembly connected to the lower control arm and an upper control arm connected to the steering knuckle and hub assembly by connecting the lower control arm to the suspension support, connecting the upper control arm to the brace and connecting the shock mount to the platform; and wherein the adaptor is capable of coupling with a turnable strut type suspension assembly that includes a strut assembly with a strut mount, a steering knuckle and hub assembly connected to the strut and a control arm connected to the steering knuckle and hub assembly by connecting the strut mount to the platform and connecting the control arm to the suspension support.

* * * * *